(12) United States Patent
Schiro' et al.

(10) Patent No.: US 6,941,730 B2
(45) Date of Patent: Sep. 13, 2005

(54) SLICING AND VACUUM-PACKING ASSEMBLY

(75) Inventors: Paoluccio Schiro', Verona (IT); Giorgio Isotta, Verona (IT)

(73) Assignee: TECLA di Schiro & Isotta Snc, Verona (IT)

( * ) Notice: Subject to any disclaimer, the term of this patent is extended or adjusted under 35 U.S.C. 154(b) by 0 days.

(21) Appl. No.: 10/745,521

(22) Filed: Dec. 29, 2003

(65) Prior Publication Data

US 2004/0134359 A1 Jul. 15, 2004

(30) Foreign Application Priority Data

Dec. 27, 2002 (IT) ..................................... VR2002A0132

(51) Int. Cl.[7] .............................................. B65B 31/00
(52) U.S. Cl. ............................... 53/512; 53/517; 53/518
(58) Field of Search .......................... 53/512, 513, 514, 53/517, 516, 518

(56) References Cited

U.S. PATENT DOCUMENTS

| | | | | |
|---|---|---|---|---|
| 4,523,435 A | * | 6/1985 | Lord ........................... | 62/212 |
| 4,541,224 A | * | 9/1985 | Mugnai ....................... | 53/434 |
| 4,580,475 A | * | 4/1986 | Antonissen ................. | 83/75.5 |
| 4,709,535 A | * | 12/1987 | Mahaffy et al. ............. | 53/473 |
| 4,794,996 A | * | 1/1989 | Wallace et al. ............ | 177/25.14 |
| 5,048,269 A | * | 9/1991 | Deni ........................... | 53/512 |
| 5,239,808 A | * | 8/1993 | Wells et al. .................. | 53/512 |
| 5,352,323 A | * | 10/1994 | Chi .......................... | 156/583.9 |
| 5,638,664 A | * | 6/1997 | Levsen et al. ................ | 53/512 |
| 5,826,404 A | * | 10/1998 | Fuss et al. .................... | 53/459 |
| 5,918,444 A | * | 7/1999 | Kuchler ....................... | 53/517 |
| 6,279,302 B1 | * | 8/2001 | Kuchler ....................... | 53/517 |
| 6,666,006 B2 | * | 12/2003 | Kuchler ....................... | 53/514 |
| 6,694,710 B2 | * | 2/2004 | Wang .......................... | 53/512 |
| 6,752,056 B1 | * | 6/2004 | Weber .......................... | 83/98 |

* cited by examiner

*Primary Examiner*—Sameh H. Tawfik
(74) *Attorney, Agent, or Firm*—Nixon & Vanderhye P.C.

(57) ABSTRACT

The invention relates to an operating and vacuum packaging machine comprising a handling or processing machine for the handling or processing of a product to be vacuum packed, and a vacuum packing unit designed to work sequentially with said operating machine.

17 Claims, 4 Drawing Sheets

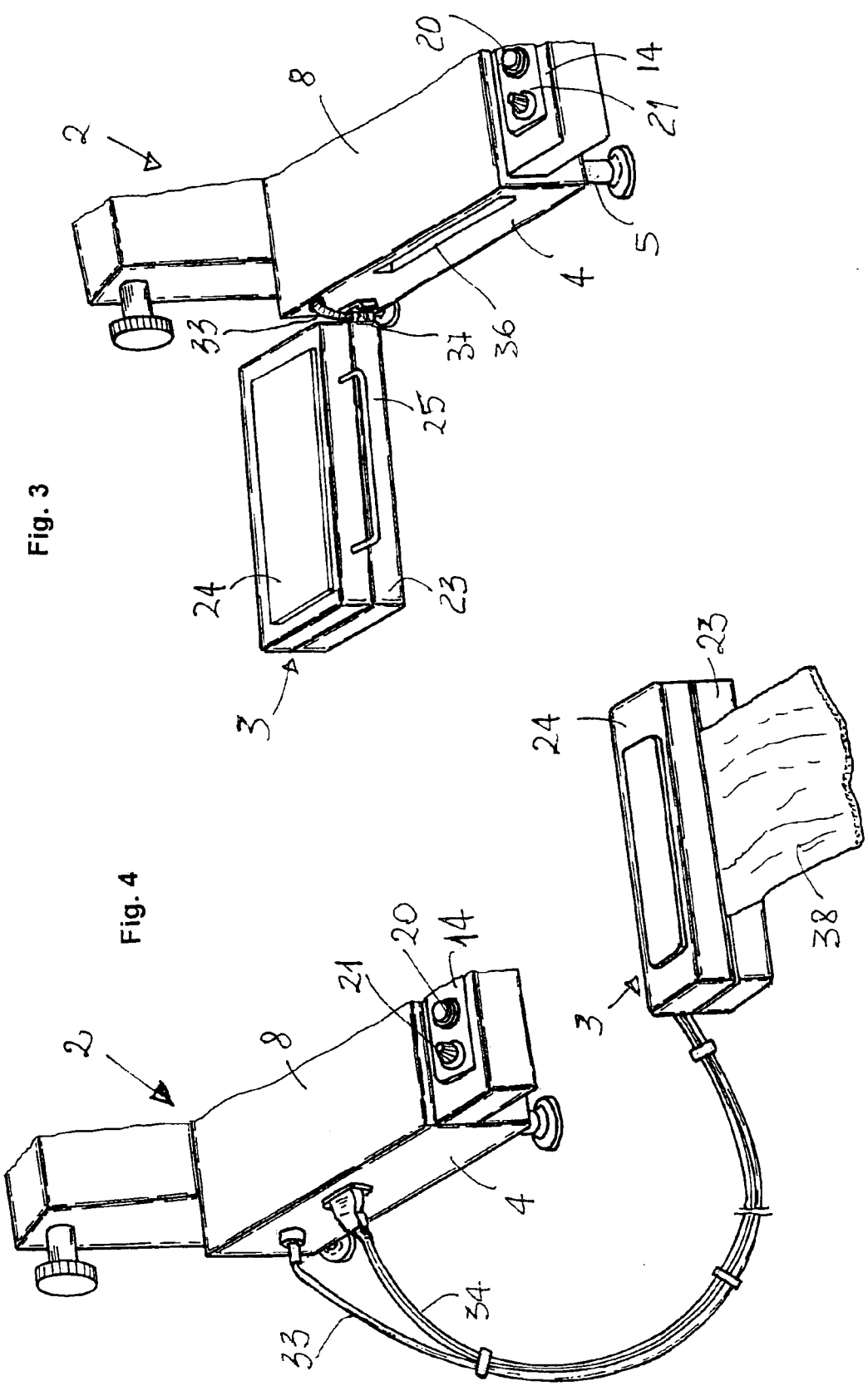

SLICING AND VACUUM-PACKING ASSEMBLY

FIELD OF THE INVENTION

The present invention relates to a slicing and vacuum-packing assembly, particularly suitable for slicing and promptly vacuum-packing food produce, e.g. ham, salami and meat.

BACKGROUND OF THE INVENTION

In the field of the sale and distribution of food products there is an ever increasing need of packing food soon after the same has been worked of handled to ensure that it is stored under the best possible conditions for an as long as possible time interval. This is especially true for sliced meat or salami which is usually subject to rapid oxidation and deterioration processes if left exposed to the air. A whole technical field has been developed to meet this problem, based particularly on the so-called "vacuum-packing", i.e. packaging in an environment from which air has been sucked, and is thus greatly depleted of oxygen, delimited by either a rigid or a flexible plastic containers (pouches). Sliced food produce served at meat counters of stores is usually packed on the spot following a succession of steps each carried out at different locations some times relatively quite apart from one another, i.e. slicing the produce at a slicer, placing it into a pouch, weighting it at a scale, and transferring it onto a vacuum packing machine located elsewhere which, upon control, draws air from the pouch and seals it.

Quite apart from the obvious inconvenience caused to the operator who has to move from one part of the counter to another to complete a produce packing process, a significant amount of time is also wasted that could be better spent to serve promptly customers, while the sliced produce is exposed to the air for a longer time.

SUMMARY OF THE INVENTION

The main object of the present invention is to provide a slicing and vacuum packing assembly suitable for greatly reducing or obviating the above shortcomings, as compared with solutions that have been proposed so far.

Another object of the present invention is to provide a slicing and vacuum packing assembly that can be manufactured according to various embodiments in order to meet a wide range of needs in the retail sale field of sliced food produce.

A further object of the present invention is to provide a slicing and vacuum packing assembly operating at high speed, handy to use and suitable for being manufactured at competitive costs.

These and other objects that will be better appear below are accomplished by an assembly according to the invention, which comprises a machine for handling or processing a produce, characterised in that said machine includes a vacuum packing unit designed to sequentially operate with said handling or processing machine.

Advantageously, said handling or processing machine comprises a slicer having a support structure, a rotary cutting blade mounted for rotation in said support structure, an electric motor for causing said cutting blade to rotate, and a carriage or slide arranged to be displaced in front and parallel to the said cutting blade and arranged to support and feed a product to be sliced, and a sliced produce receiving platform arranged on the opposite side of said cutting blade with respect to said carriage or slide, characterised in that said support structure delimits a receiving compartment below said carriage or slide and said receiving platform for housing at least partly said vacuum packing machine, and on the outside it is provided with a common control panel for said slicer and said vacuum packing unit.

BRIEF DESCRIPTION OF THE DRAWINGS

Further aspects and advantages of the present invention will be better apparent in the following detailed description of some currently preferred embodiments thereof given merely by way of non-limiting examples, with reference to the accompanying drawings, in which:

FIG. 3 is a partial perspective view, slightly from above, of another embodiment of a slicer-vacuum packing assembly according to the invention;

FIG. 4 shows a partial perspective view of another embodiment of a slicer-vacuum packing assembly according to the invention;

In the accompanying drawings similar or identical parts or components have been designated by the same reference numerals.

DETAILED DESCRIPTION OF THE PREFERRED EMBODIMENTS

Figure 1:
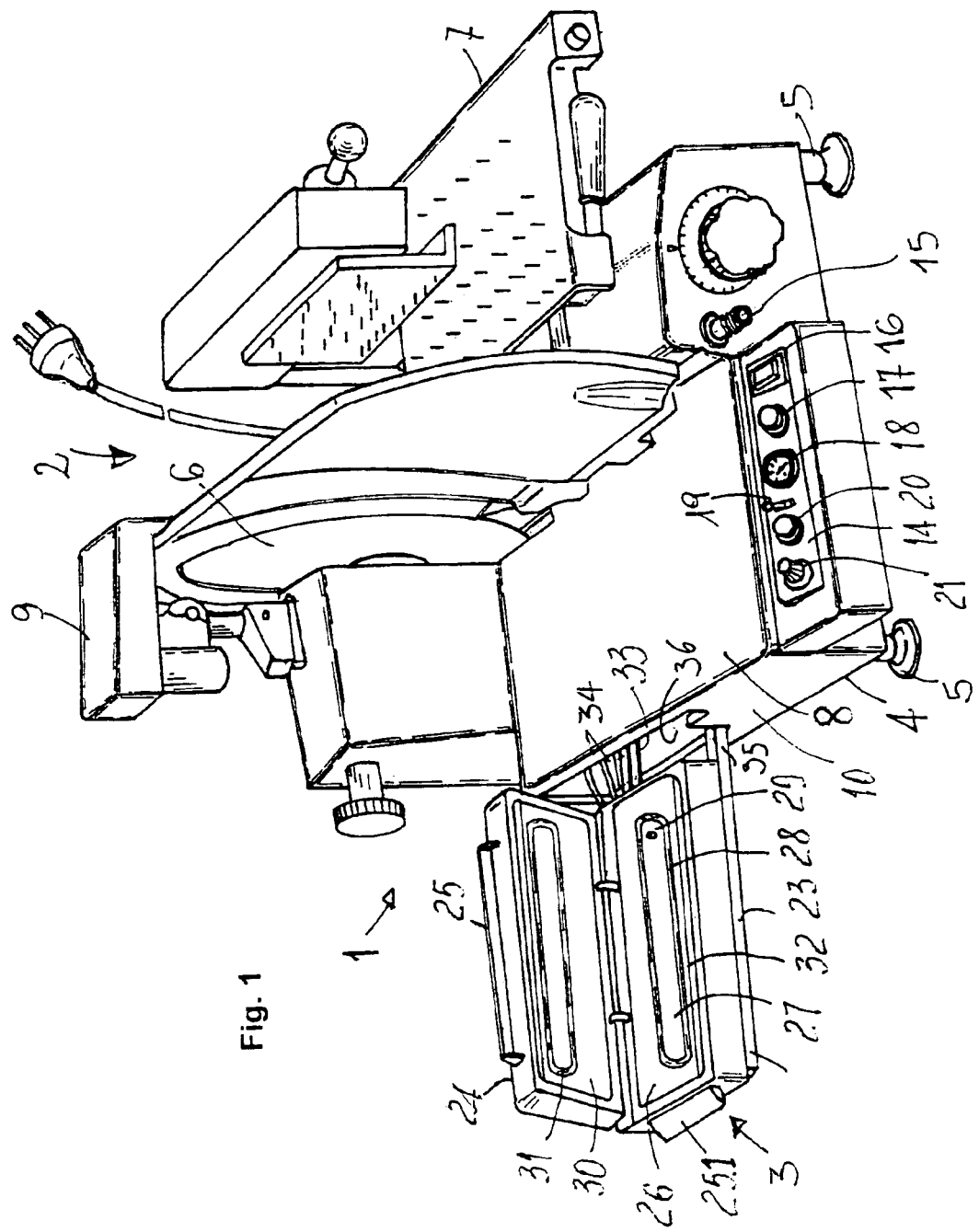
FIG. 1 is a perspective view slightly from above of a slicer-vacuum packing assembly according to the invention.
Figure 2:
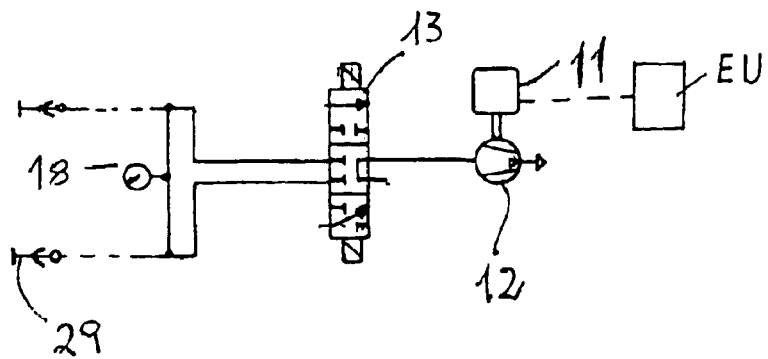
FIG. 2 shows a diagram of a pneumatic circuit of a vacuum-packing machine in the slicer-vacuum packing assembly in FIG. 1.

With reference first to the embodiment shown in FIGS. 1 to 4 it will be noted that a handling or processing machine-vacuum packing assembly according to the present invention, generally designated at 1, comprises a handling or processing machine for handling or processing a product to be vacuum packed, that comprises a slicer 2, or a meat chopper 2a (FIG. 6), or a kneading machine, or a heating unit 2b (FIG. 7), and the like, and a vacuum-packing unit 3 designed to operate in sequence with the handling or processing machine 2.

In the following description specific reference will be made in more detail to a slicer 2, although it will be appreciated that the invention relates to handling or processing machines other than a slicer.

The slicer 2 may be of any suitable type. Typically it comprises a box-like frame or housing 4 supported by four legs 5 with height-adjustable feet, a rotary cutting blade 6 mounted for rotation in a support structure 4 and driven by an electric motor (not shown in the drawings), a slide or carriage 7 arranged on one side of the rotating blade 6 and suitable for feeding the cutting blade 6 with a product to be sliced, and to be displaced backwards and forwards parallel to the cutting plane, and a sliced meat receiving plane or platform 8 arranged on the other side of said carriage or slide 7. Preferably, at the cutting blade 6 a sharpening or grinding tool, generally indicated at 9, is provided for sharpening the cutting edge of blade 6.

Below the carriage or slide 7 and the receiving surface 8, support structure 4 delimits one or more compartments 10 for housing all or some of the components of the vacuum packing unit 3 having more specifically a vacuum pump 12 and its respective motor 11, as well as a delivery electric valve 13 and a control electronic unit EU of any suitable type arranged to control the assembly 1.

On its outer front side, housing 4 supports a control panel 14 that is in common for the slicer 2 and the vacuum-packing unit or machine 3, and a fixed connector 15 for connection thereto of one end of a flexible hose whose other end is suitable for being connected to a hose connector of a rigid container for the vacuum packing.

The control panel 14 comprises an On/Off switch 16 for the motor driving the cutting blade 6, a press-button 17 for the pump 12, a vacuum gauge 18, a switch 19 for electric valve 13, a press-button 20 for plastic bag welding and a knob 21 for setting a welding timer. If desired, the control panel 14 includes a signalling LED indicating whether the electric power is on for the handling or processing machine-vacuum packing assembly 1.

The vacuum packing unit 3 comprises two box-like halves: a base half 23 and an upper half 24 hinged to the base half along an edge thereof so as to be angularly displaceable between a closing position onto the base half 23 and an opening position with the base half angularly spaced apart from base half 23 as illustrated in FIG. 1. For easier handling the upper half 24 is provided with a front handle 25 and lower half is provided with a side handle 25.1.

At its top face 26 the base 23 delimits a longitudinal recess 27 surrounded by a raised gasket 28. At the bottom of the recess 27, one or more openings or holes 29 communicating with the pump intake 12 by means of solenoid 13 are provided.

The bottom face 30 of the upper half 24 has in turn an annular gasket 31 so shaped and positioned that it matches with the annular gasket 28 when the upper half 24 is in its closed position, so that it can hold in position the mouth of a flexible plastic bag 38 in a relatively gentle and resilient way. The bag or pouch 38 is preferably embossed, and air is drawn from it, and it can be heat welded as it is well known in the art.

To this end, a welding and sealing wire 32, e.g. provided in the base 23, extends parallel to a long section of the annular gasket 28 and is designed to be supplied with electric current immediately after a packing bag 38 has been substantially emptied of its air in order to heat weld and seal the bag or pouch 38.

The vacuum packing machine 3 can be positioned in various ways with respect to the slicer 2. Thus, for example, as illustrated in FIG. 1, it is connected through a flexible hose 33, which, from opening 29 is connected to electric valve 13 and thus to pump intake 12, and through electrical cables 34 both to the electronic unit and the electric valve 13. Alternatively, the base 23 can be supported by a pair of extendable rods 35 that can be slid in and out of beneath casing 4 through a side opening 36, preferably shaped to match the cross-section outlined of the vacuum-packing unit so as to allow the packing machine to be easily displaced to and from its closed position.

With the above described handling or processing machine-vacuum packing assembly 1, the vacuum-packing unit 3 can be displaced in a drawerlike fashion so that it can be completely inserted and flush beneath the housing 4 and completely extracted to its working position, at which the top half 24 can be opened to effect one or more vacuum packing operations and later returned to its initial closed position within the housing 4.

FIG. 3 shows a modification of the present invention in which the vacuum packing unit 3 is hinged on a vertical pin 37 supported by the housing 4 of the meat mincer 2, so that it can be angularly displaced between a rest position up against the side of the housing 4 and a working position angularly spaced away from it, where it can effect operations of air-drawing from, and sealing, the packing pouches 38.

In the embodiment illustrated in FIG. 4, the vacuum-packing unit 3 is connected by a flexible hose 33 and an electric cable 34 to the meat slicing machine and can be variously arranged within a certain distance that is naturally dependent on the length of tube 33 and cable 34. The packing unit 3 is shown as it welds and seals a pouch 38 made of heat-weldable flexible material.

Figure 5:
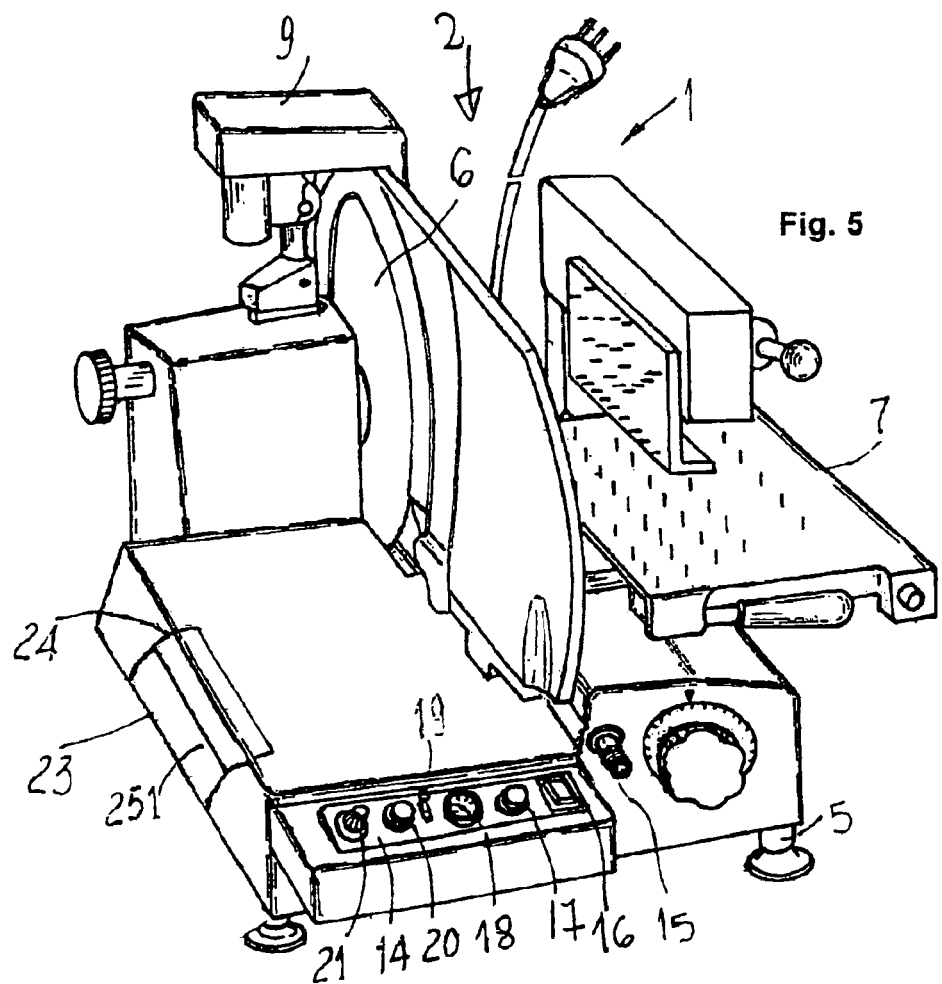
FIG. 5 is a view similar view to that of FIG. 1 but illustrating an embodiment in which the vacuum-packing unit is entirely incorporated into the meat slicing machine.

FIG. 5 illustrates a currently preferred embodiment of the invention, wherein the packing machine 3 is completely housed, e.g. under the product receiving surface 8 of the meat slicing machine 2. This solution provides maximum space saving for a sales counter as well as a compact, functional and highly efficient assembly for the operator to use.

Figure 6:
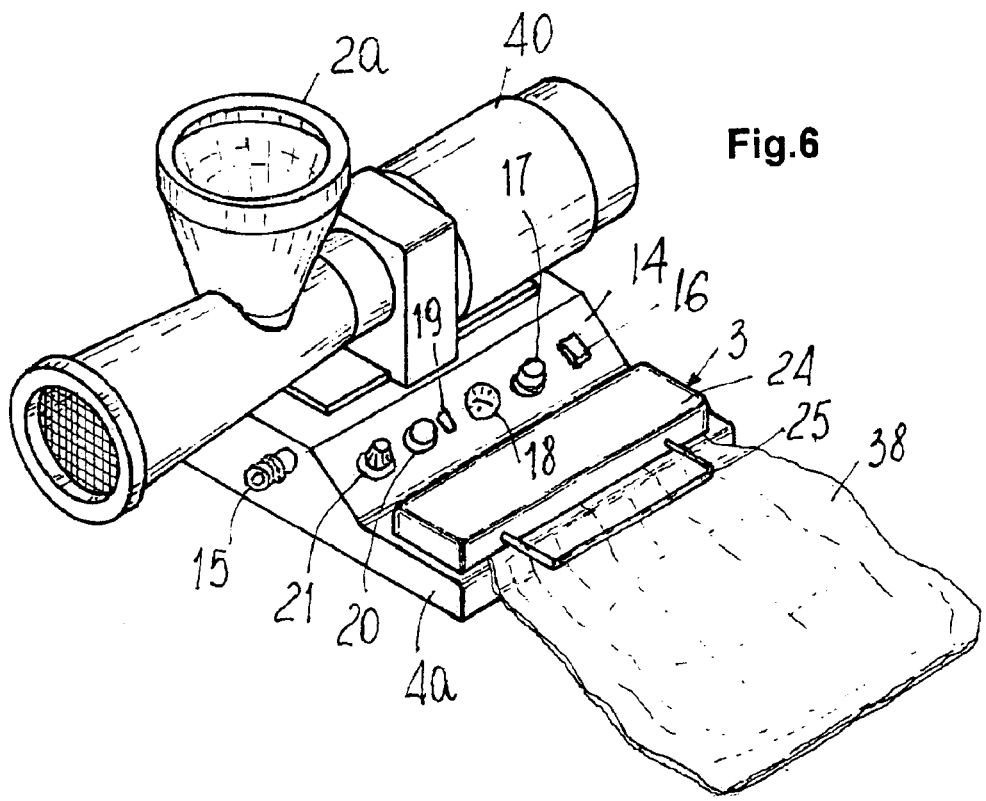
FIG. 6 is a perspective view slightly from above of a meat mincer machine incorporating a vacuum packing unit.

In the embodiment shown in FIG. 6 a meat mincer 2_a_ is controlled by an electric motor 40 and supported on a base 4.

Figure 7:
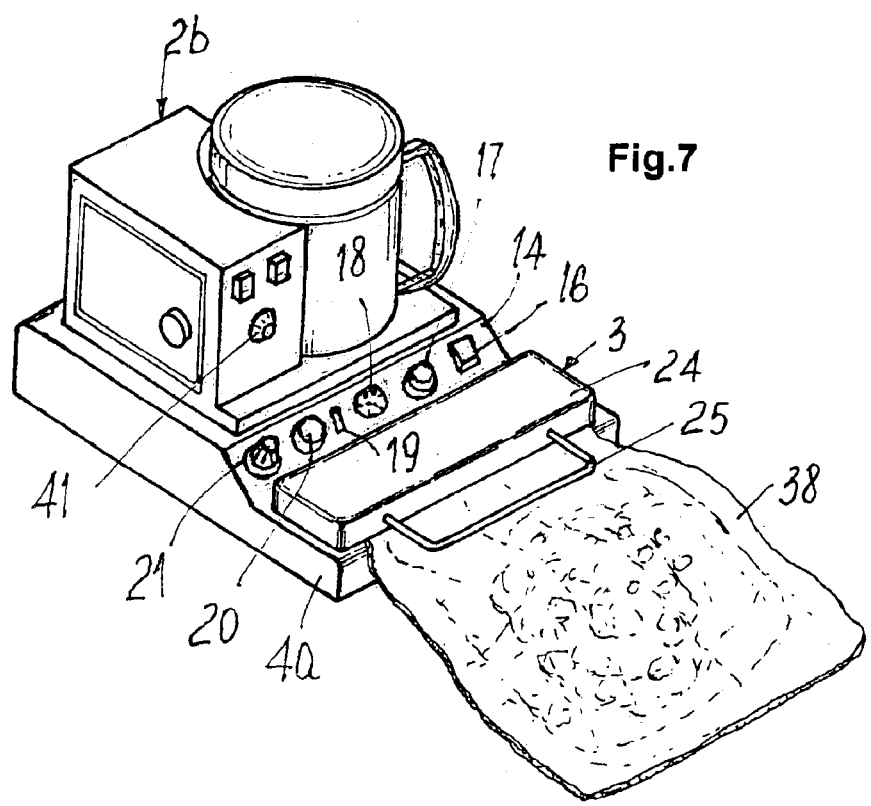
FIG. 7 is a perspective view slightly from above of a heating unit incorporating a vacuum packing unit.

Similarly, FIG. 7 shows an embodiment of the assembly 1 in which a heating unit 2_b_ of any suitable type including a heat source either including one or more electric resistances controlled by rheostat manually operated by a knob 41 or a gas burner.

Both in FIGS. 6 and 7 base 4 has an extension 4_a_, preferably having a reduced height and also forming the base for a vacuum packing unit 3 with a top half 24 hinged thereto and provided with front handle 25.

The base 4 also bears on its outer front side a control panel 14 that is in common for the meat mincer 2_a_ or the heating unit 2 and the vacuum-packing unit 3, and a fixed connector 15 for connection thereto of one end of a flexible hose whose other end can be connected to a hose connector of a rigid container for the vacuum packing.

The control panel 14 comprises an On/Off switch 16 for the motor 40, a press-button 17 for the pump 12, a vacuum gauge 18, a switch 19 for electric valve 13, a press-button 20 for plastic bag welding and a knob 21 for setting a welding timer. If desired, the control panel 14 includes a signalling LED indicating whether the electric power is on for the handling or processing unit-vacuum packing assembly 1.

With a handling or processing machine-vacuum packing assembly 1 as described above, the operator at the sales counter has his or work made considerably easier because both the meat slicing machine and the packing machine are ready at hand with no waste of time moving from one to point to another behind the sales counter.

The structuring of the packing machine 3 was also made simpler in that it is no longer necessary to include the pump, motor and electric valve 13 assembly, all of which means that the size of the machinery can be reduced to provide more working space at the sales counter.

The invention thus conceived is susceptible to numerous modifications, all within the scope of the invention as stated in the claims.

Thus for example, if the hose connection 15 is not included on the meat slicing machine 2, the electric valve 13 and the switch 19 can be omitted since it is not necessary to divert the inflow between packing unit 3 and the pump 12, a check valve being sufficient between opening 29 and pump, as is usual in the art.

What is claimed is:

1. A vacuum packing machine assembly comprising:
    a vacuum packing unit arranged to suck air from a flexible packaging bag, and provided with sealing means for said packaging bag, and
    a slicing machine for handling or processing a product to be packed under vacuum, said handling or processing machine being designed to sequentially operate with said vacuum packing unit.

2. An assembly as claimed in claim 1, wherein said machine has a support structure including at least one compartment suitable for at least partly housing said vacuum packing unit, and a common control panel for said machine and said vacuum-packed unit.

3. An assembly as claimed in claim 1, wherein said vacuum packing unit is articulated to a support structure of said machine, said vacuum packing unit being angularly displaceable between a rest position adjacent a side of the support structure and a working position angularly displaced from the side of the structure.

4. An assembly as claimed in claim 3, wherein the vacuum packing unit is pivotably mounted on a pin provided to said machine.

5. An assembly as claimed in claim 1, wherein said vacuum packing unit is communicated with a support structure by means of at least one flexible hose and at least one electric cable.

6. An assembly as claimed in claim 1, wherein said vacuum packing unit includes at least one support rod mounted on a support structure so that the vacuum packing unit is insertable into and removable from said support structure in drawer-like fashion.

7. An assembly as claimed in claim 6, wherein the vacuum packing unit includes upper and lower halves that are hingedly connected, said upper and lower halves being openable along an axis that is substantially parallel to the at least one support rod when the vacuum packing unit is in an operable position, said upper and lower halves assuming a folded position when stored within said support structure.

8. An assembly as claimed in claim 7, wherein a side portion of the vacuum packing unit is substantially flush with a side of the support structure in the folded position within the support structure.

9. An assembly as claimed in claim 8, wherein one of the upper and lower halves includes a handle on the side portion of the vacuum packing unit.

10. An assembly as claimed in claim 1, wherein said machine comprises a slicer having said support structure, a rotary cutting blade, an electric motor for causing said cutting blade to rotate, a carrriage or slide arranged to be displaced in front and parallel to the cutting blade and arranged to support and feed a product to be sliced, and a sliced product receiving platform arranged on the opposite side of said cutting blade with respect to said carriage or slide, said support structure defining a receiving compartment below said carriage or slide, said housing including a receiving platform at least partly housing said vacuum packing unit, said housing including a common control panel for said slicer and said vacuum packing unit.

11. An assembly as claimed in claim 1, wherein said support structure has an extension arranged to support said vacuum packing unit and is arranged to locate a common control panel for said slicing machine and said vacuum packing unit.

12. A processing assembly comprising:
    a slicing machine to perform a machine process on a product;
    a vacuum packing unit constructed to perform a vacuum packing process on the product; and
    a communication line between the machine unit and the vacuum packing unit to coordinate the machine process of the machine unit with the vacuum packing process of the vacuum packing unit.

13. An assembly as claimed in claim 12, further comprising a common support structure to support the machine unit and the vacuum packing unit.

14. An assembly as claimed in claim 13, further comprising a common control panel provided to the common support structure, said common control panel including at least one control for each of the machine unit and the vacuum packing machine.

15. An assembly as claimed in claim 12, wherein the communication line includes a cable.

16. An assembly as claimed in claim 12, wherein the communication line includes a pneumatic hose.

17. An assembly as claimed in claim 12, wherein the communication line is configured to coordinate sequential operation between the machine unit and the vacuum packing unit.

* * * * *